R. H. ENEIX & R. W. E. LOWELL.
AUTOMOBILE LAMP CONTROLLER.
APPLICATION FILED OCT. 7, 1910.
998,760.
Patented July 25, 1911.
2 SHEETS—SHEET 1.
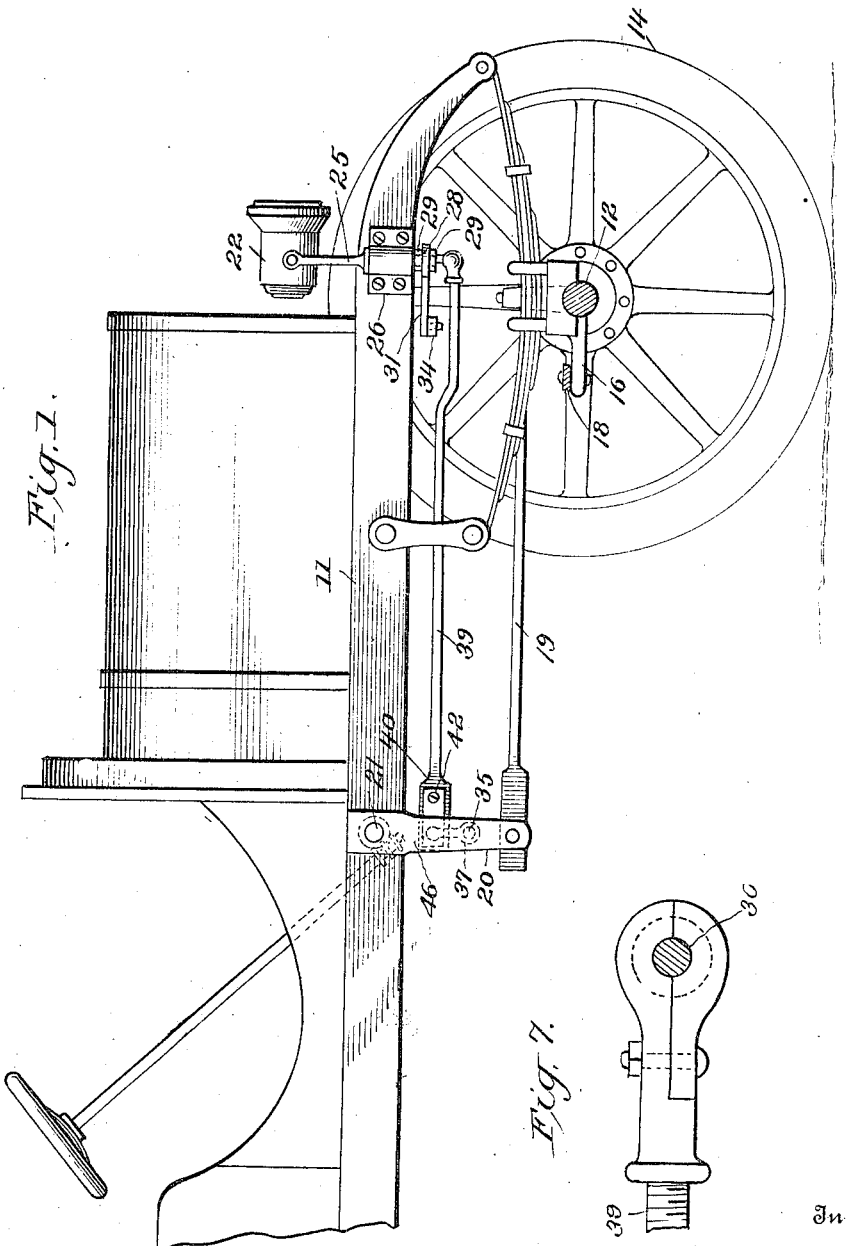

R. H. ENEIX & R. W. E. LOWELL.
AUTOMOBILE LAMP CONTROLLER.
APPLICATION FILED OCT. 7, 1910.
998,760.
Patented July 25, 1911.
2 SHEETS—SHEET 2.
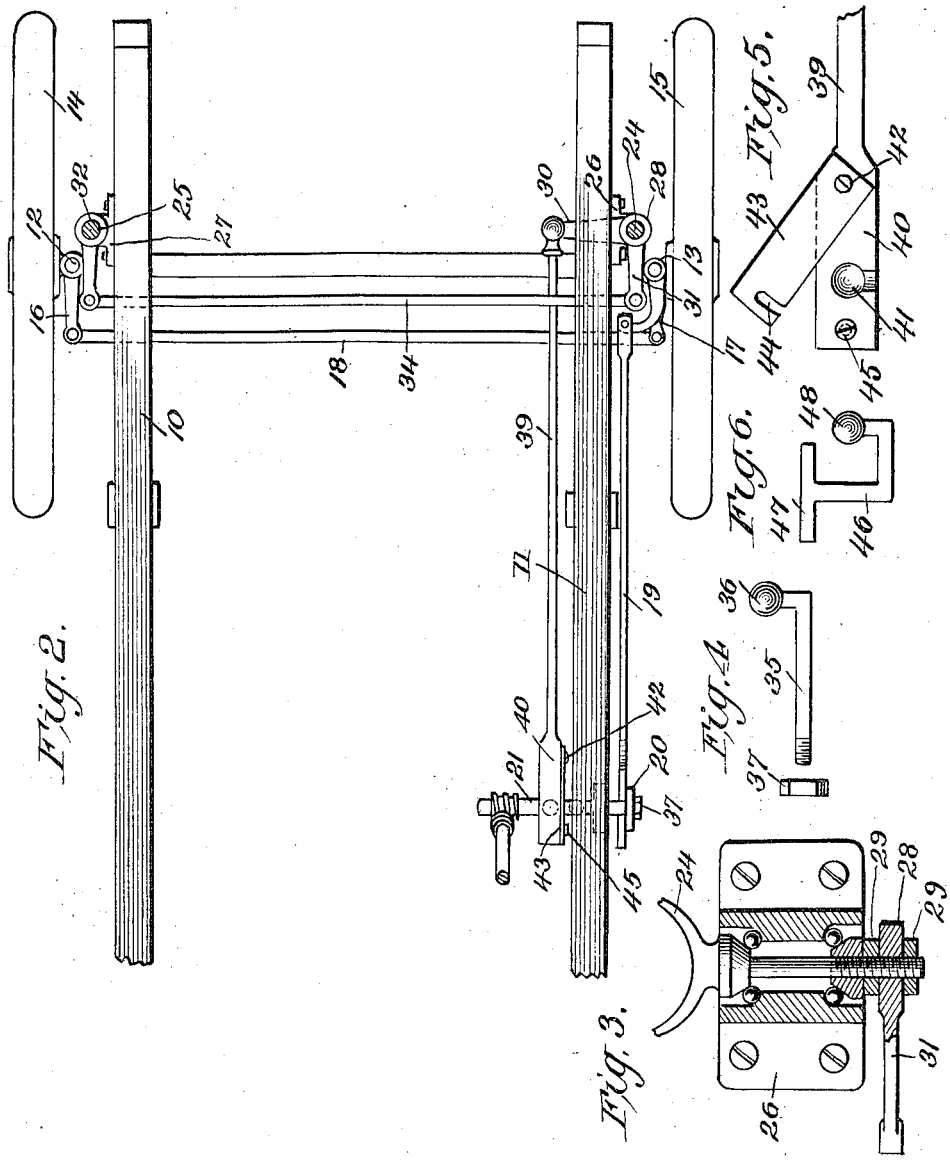
Witnesses
W. N. Woodson.
Juana M. Fallin.
Inventors
R. H. Eneix and
R. W. E. Lowell
By Attorneys.

UNITED STATES PATENT OFFICE.

ROY H. ENEIX AND RALPH W. E. LOWELL, OF ANITA, IOWA.

AUTOMOBILE LAMP-CONTROLLER.

998,760.

Specification of Letters Patent. Patented July 25, 1911.

Application filed October 7, 1910. Serial No. 585,846.

*To all whom it may concern:*

Be it known that we, ROY H. ENEIX and RALPH W. E. LOWELL, citizens of the United States, residing at Anita, in the county of Cass and State of Iowa, have invented certain new and useful Improvements in Automobile Lamp-Controllers, of which the following is a specification.

This invention relates to improvements in devices for moving the lamps of automobiles simultaneously with the movements of the steering wheels so that the light of the lamps will automatically follow the course of the machine both when moving along straight lines and when moving on curves, and has for one of its objects to simplify and improve the construction and increase the efficiency and utility in devices of this character.

Another object of the invention is to provide a device of this character which may be readily coupled to and uncoupled from the steering gear, and with means for locking the lamp operating mechanism to the frame of the machine, so that the lamps are held stationary and not effected by the movements of the steering gear.

With these and other objects in view the invention consists in certain novel features of construction and arrangement of the parts as hereafter shown and described and then specifically pointed out in the claim; and, in the drawings is illustrated the preferred embodiment of the invention.

Figure 1 is a side elevation, partly in section, of a portion of an automobile with the improvement applied. Fig. 2 is a plan view of the parts shown in Fig. 1. Fig. 3 is a sectional detail of the bearing of one of the lamp supports. Figs. 4, 5 and 6 are detail views enlarged, of the coupling means between the steering mechanism and the operating rod of the lamps. Fig. 7 is an enlarged detail of the coupling between the connecting member of the lamp yoke mechanism and the steering mechanism.

Corresponding and like parts are referred to in the following description and indicated in all the views of the accompanying drawings by the same reference characters.

The improved device may be applied without material structural changes to automobiles of various forms and makes, but for the purpose of illustration is applied to a conventional automobile frame, and in the drawings thus employed the side-members of the frame are indicated at 10—11, the forward stub-axles at 12—13, the forward wheels at 14—15, the steering arms at 16—17, the connecting rod of the steering arms at 18, the operating rod of the steering mechanism at 19, and the steering crank-arm at 20, the latter connected to a stub-shaft 21 carried by the frame 11. All of the parts are of the usual construction.

The lamps are mounted for rotation upon the frame members 10—11, and are represented conventionally at 22 and supported by the forked members 24—25. The forked support 24 is mounted for rotation in a bearing bracket 26 connected to the frame member 11, while the fork 25 is supported for rotation upon a bearing bracket 27 on the frame member 10. The stem of the fork 24 extends below the frame member 11 and is threaded at its lower portion. The lamp supporting forks or horns, are precisely alike, and the description of one will suffice for both. The bracket bearings 26—27 are provided with step ball-bearings to reduce the friction, and the stems of the lamp forks are threaded below the brackets to provide means for coupling the operating arms thereto. Connected to the stem of the lamp fork which is located upon the frame member 11 is a bell-crank lever comprising an elbow portion 28 rigidly coupled to the stem of the fork by jam-nuts 29 with one arm 30 directed inwardly toward the frame member 10, while the other arm 31 is directed rearwardly or substantially parallel with the frame member 11 when the lamp fork is arranged to hold the lamp so that its rays of light are thrown in alinement with the frame member or directly ahead. The stem of the lamp fork which is connected to the frame member 10 comprises a hub 32 rigidly coupled to the stem by suitable jam-nuts with a single arm 33 directed rearwardly or in parallel relations to the arm 31 when the lamp forks are arranged to hold the lamps directed forwardly. The arms 31—33 are coupled by a rod 34, so that the lamp forks are operated simultaneously. Extending inwardly from the member 20 is a lateral arm 35 directed upwardly at its inner end and terminating in a ball 36. At its outer end the lateral arm 35 is threaded into the crank arm 20 and locked rigidly thereto by a jam-nut 37. Connected at one end at 38 to the arm 30 of the bell crank lever is a connecting rod 39, the rod being coupled at its other end to the terminal of the lateral arm 35. The coupling between the rod 39 and the lateral arm 35 is clearly shown in detail in Figs. 4, 5 and 6 and forms an important part of the improved device.

At its rear end the rod 39 is enlarged, as shown at 40, and formed in the enlarged portion is a cavity 41 adapted to receive the ball 36 of the lateral arm 35. The cavity 41 communicates at the lower end through the bottom of the enlarged portion 40 and fitting by the communicating portion around the neck of the arm 35 next to the ball 36. Mounted to swing at 42 upon the enlarged portion 40 of the rod 39 is a plate 43 which forms a closure to the cavity 41 and prevents the displacement of the ball 36. The plate 43 is provided with a segmental slot 44 which fits around the neck portion of a clamp-screw 45. The slot 44 bears at its inner end upon the screw 45, and then by actuating the latter with a screw-driver or other implement the plate 43 can be firmly clamped in position. By this means an effectual ball and socket joint is formed between the lateral arm 35 and the rod 39. By this arrangement it will be obvious that when the member 20 is actuated to move the steering mechanism the arm 35 will correspondingly move the rod 39 and adjust the lamps which are carried by the forks 24—25 to the same extent as the wheels are "cramped". Thus, when the operator actuates the steering mechanism the lamps are simultaneously actuated therewith, and the lights caused to follow the line of travel and light the roadway constantly in advance of the forward wheels in all their varying positions.

In constructing the improved device it will be necessary to so arrange the parts that the rays of light will extend at all times parallel with the forward wheels, and the ratio of the arc made by the steering arm 20 must equal the ratio of the arc made by the lateral arm 35, and likewise to the arc made by the bell-crank arm 31 and the lever arm 33. These proportions must necessarily be changed slightly with machines of different makes, but this would not constitute a departure from the principle of the invention or sacrifice any of its advantages. All of the parts are detachable and are either screwed in place or retained by bolts or nuts.

The arms 30—31 and the hubs 28 are preferably forged from steel, while the arm 33 and hub 32 are also preferably forged from steel. By connecting the bell-crank lever 30—31 and the arm 33 to the lamp fork stems by the nuts, they can be readily detached when required without disarranging any of the other parts.

Provision is made in the improved device for locking the rod 39 to the frame member 11, if for any reason the lamp mechanism is not required, or when the machine is employed in the day time, and this locking mechanism comprises a bracket 46 depending from a plate 47, the latter rigidly connected in any suitable manner to the frame 11. At its lower end the bracket 46 is directed upwardly and terminates in a ball 48 corresponding to the ball 36 of the lateral arm 35. By this arrangement it will be obvious that by loosening the plate 43 the arm 39 may be detached from the ball 36 and coupled in the same manner to the ball 48, and then restoring the plate 43 to its former position, and locking the rod 39 rigidly to the machine, will leave the arm 35 free to be moved with the steering gear, but without producing any movement upon the lamps.

Having thus described the invention what is claimed as new is:—

The combination with the frame of an automobile, of lamp supports mounted for oscillation upon said frame, a steering mechanism including a crank arm, a rod extending laterally from said crank arm and having a ball at its free end, a bracket device extending from said frame and having a ball at its free end, a connecting member coupled at one end to said lamp supports and having a socket at its other end for receiving the ball of the lateral arm or the ball of the bracket device, a plate pivoted at one end to said connecting member and forming a closure to the socket thereof when in one position, and means for locking said plate to said connecting member.

In testimony whereof, we affix our signatures in presence of two witnesses.

ROY H. ENEIX. [L. S.]
RALPH W. E. LOWELL. [L. S.]

Witnesses:
E. S. HOLTON,
SHERM. F. MYERS.